United States Patent
Chen

(10) Patent No.: US 11,156,489 B2
(45) Date of Patent: Oct. 26, 2021

(54) VOLUME METER AUXILIARY MODULE ASSEMBLED ON THE FLUID VOLUME METER TO DIGITALIZE THE VALUES

(71) Applicant: Chicony Electronics Co., Ltd., New Taipei (TW)

(72) Inventor: Ching-Chung Chen, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 175 days.

(21) Appl. No.: 16/656,590

(22) Filed: Oct. 18, 2019

(65) Prior Publication Data

US 2020/0141781 A1 May 7, 2020

(30) Foreign Application Priority Data

Nov. 1, 2018 (TW) .................................. 107138838

(51) Int. Cl.
| | |
|---|---|
| *G01F 15/07* | (2006.01) |
| *G01F 15/075* | (2006.01) |
| *G01F 1/05* | (2006.01) |
| *G01F 25/00* | (2006.01) |
| *G01F 15/18* | (2006.01) |
| *G01F 15/06* | (2006.01) |
| *G01F 15/14* | (2006.01) |

(52) U.S. Cl.
CPC .............. *G01F 15/075* (2013.01); *G01F 1/05* (2013.01); *G01F 15/06* (2013.01); *G01F 15/14* (2013.01); *G01F 15/18* (2013.01); *G01F 25/0007* (2013.01)

(58) Field of Classification Search
None
See application file for complete search history.

(56) References Cited

U.S. PATENT DOCUMENTS

| | | | | |
|---|---|---|---|---|
| 4,422,325 | A * | 12/1983 | Sutherland | G01F 15/14 |
| | | | | 73/273 |
| 6,748,802 | B1 * | 6/2004 | Hendey | G01F 15/18 |
| | | | | 73/272 R |
| 6,853,309 | B1 * | 2/2005 | Schroter | G01F 15/06 |
| | | | | 340/870.02 |

(Continued)

FOREIGN PATENT DOCUMENTS

| | | |
|---|---|---|
| CN | 105547393 A | 5/2016 |
| CN | 206339275 U | 7/2017 |
| TW | M366068 U1 | 10/2009 |

*Primary Examiner* — Harshad R Patel
(74) *Attorney, Agent, or Firm* — CKC & Partners Co., LLC

(57) ABSTRACT

A volume meter auxiliary module is configured to be assembled on a fluid volume meter. The volume meter auxiliary module includes a first assembly member and a second assembly member. The first assembly member includes a clamping structure configured to fix the first assembly member on the fluid volume meter. The second assembly member is configured to connect with the first assembly member. The second assembly member includes a casing body, a light emitter, an image-capturing piece and a cover. The casing body has a first opening and a second opening. The first opening is located at a bottom of the casing body. The light emitter is disposed inside the casing body. The image-capturing piece is disposed inside the casing body. The cover connects with the casing body and covers the second opening. The cover is rotatable relative to the casing body.

13 Claims, 15 Drawing Sheets

(56) References Cited

U.S. PATENT DOCUMENTS

| | | | | |
|---|---|---|---|---|
| 7,475,602 B2* | 1/2009 | Molenaar | ............... | G01F 1/662 |
| | | | | 73/861.18 |
| 8,931,337 B2* | 1/2015 | Renoud | .................. | G01F 15/14 |
| | | | | 73/198 |
| 2011/0090074 A1* | 4/2011 | Kuno | ........................ | B60R 1/00 |
| | | | | 340/438 |
| 2011/0174083 A1* | 7/2011 | Berger | .................... | G01F 15/18 |
| | | | | 73/861.27 |
| 2013/0160561 A1* | 6/2013 | Chen | .................... | G01L 19/083 |
| | | | | 73/753 |
| 2019/0070961 A1* | 3/2019 | Kim | .................... | G02B 27/144 |

* cited by examiner

VOLUME METER AUXILIARY MODULE ASSEMBLED ON THE FLUID VOLUME METER TO DIGITALIZE THE VALUES

RELATED APPLICATIONS

This application claims priority to Taiwanese Application Serial Number 107138838, filed Nov. 1, 2018, which is herein incorporated by reference.

BACKGROUND

Technical Field

The present disclosure relates to volume meter auxiliary modules.

Description of Related Art

With the advancement of the technology, the volume meters used in the old days gradually transform to be digitalized, and become the so-called smart volume meters. Taking water meter as an example, most of the old water meters were of the mechanical type. For mechanical water meters, water current can be used to drive the gears of the water meter to rotate, in order to calculate the flow volume. This does not involve too many functions of electronic control or electronic sensing. In this regard, in order to facilitate the knowledge of the volume of water used or to conveniently record the volume of water used in a digital manner, electronic water meters have also been developed. Unlike mechanical water meters, electronic water meters use sensors to sense the volume of water used and record the volume of water used in digital form.

However, many problems will arise if the mechanical water meters of all users are to be replaced by electronic water meters. For example, the pipelines of the mechanical water meters originally set up are complicated, which are not easy to be replaced, or there are cost considerations. Therefore, how to balance between the mechanical water meters and the electronic water meters has become one of the hot development topics in the related fields.

SUMMARY

According to an embodiment of the present disclosure, a volume meter auxiliary module is configured to be assembled on a fluid volume meter. The volume meter auxiliary module includes a first assembly member and a second assembly member. The first assembly member includes a clamping structure configured to fix the first assembly member on the fluid volume meter. The second assembly member is configured to connect with the first assembly member. The second assembly member includes a casing body, a light emitter, an image-capturing piece and a cover. The casing body has a first opening and a second opening. The first opening is located at a bottom of the casing body. The light emitter is disposed inside the casing body. The image-capturing piece is disposed inside the casing body. The cover connects with the casing body and covers the second opening. The cover is rotatable relative to the casing body.

In one or more embodiments of the present disclosure, the second assembly member further includes a water-proof gasket. The water-proof gasket is configured to be placed at the bottom of the casing body. The water-proof gasket surrounds the first opening.

In one or more embodiments of the present disclosure, the volume meter auxiliary module further includes an elastic piece. The elastic piece is connected with the cover and the casing body.

In one or more embodiments of the present disclosure, the first assembly member further includes a first clamping piece and a second clamping piece. The first clamping piece includes a first base and a first frame. The first frame is connected with the first base. The second clamping piece includes a second base and a second frame. The second frame is connected with the second base. The clamping structure is formed by a mutual connection of the first base and the second base.

In one or more embodiments of the present disclosure, the first base has a protruding portion, and the second base has a recess portion. The protruding portion is configured to be embedded into the recess portion.

In one or more embodiments of the present disclosure, the first base and the second base are respectively of an arc shape extending along a same curved locus.

In one or more embodiments of the present disclosure, the first assembly member further includes at least one locking hole. The second assembly member further includes at least one locking portion. The locking portion is connected with the casing body and has at least one alignment key. The alignment key is configured to embed into the locking hole.

In one or more embodiments of the present disclosure, the volume meter auxiliary module further includes at least one locking piece. The locking piece is configured to pass through the alignment key of the locking portion and lock inside the locking hole.

In one or more embodiments of the present disclosure, the casing body of the second assembly member includes an upper subsidiary casing body and a lower subsidiary casing body. The upper subsidiary casing body is detachably assembled at the lower subsidiary casing body. The cover connects with the lower subsidiary casing body and extends from the lower subsidiary casing body to the upper subsidiary casing body.

In one or more embodiments of the present disclosure, the upper subsidiary casing body has an inclined surface. The second opening is located at the inclined surface. The cover extending from the lower subsidiary casing body to the upper subsidiary casing body covers the inclined surface and the second opening.

In one or more embodiments of the present disclosure, the volume meter auxiliary module further includes a light divider. The light divider is disposed inside the casing body. The light divider optically couples between the cover and the fluid volume meter, and optically couples between the image-capturing piece and the fluid volume meter.

In one or more embodiments of the present disclosure, the clamping structure includes a platform, two holding components and at least two first locking components. The platform is configured to abut against the bottom of the casing body. The platform has a plurality of first through holes. Each of the holding components is configured to penetrate through two of the first through holes. Each of the holding components defines a second through hole with the platform. Each of the second through holes is configured to be penetrated through by a portion of the fluid volume meter. The first locking components are located on a side of the platform abutting against the bottom of the casing body. The first locking components are configured to be respectively locked to at least one end of each of the holding components.

In one or more embodiments of the present disclosure, the first assembly member further includes a water-proof gasket. The water-proof gasket is located between the platform and the fluid volume meter.

In one or more embodiments of the present disclosure, the platform has at least one curved slot. The second assembly member further includes at least one locking portion, at least one locking piece and at least one second locking component. The locking portion is connected with the casing body. The locking piece is configured to penetrate through locking portion and the curved slot. The second locking component is located on a side of the platform away from the second assembly member. The second locking component is configured to be locked to the locking piece.

In one or more embodiments of the present disclosure, the second assembly member has an operational surface. The operational surface is substantially parallel with the platform. The second opening is located on the operational surface. The cover is pivotally connected to the operational surface.

In one or more embodiments of the present disclosure, the volume meter auxiliary module further includes a sealing element. The sealing element is disposed between the platform and the second assembly member.

In one or more embodiments of the present disclosure, the second assembly member further includes a circuit board and a battery. The circuit board is disposed inside the casing body. The circuit board is electrically connected with the light emitter and the image-capturing piece. The battery is electrically connected with the circuit board.

In one or more embodiments of the present disclosure, the second assembly member has an operational surface. The operational surface is substantially parallel with the platform. The second assembly member further includes a terminal. The terminal is disposed on the operational surface and electrically connected with the circuit board. The terminal is configured to electrically connect to an external processor.

In one or more embodiments of the present disclosure, the second assembly member further includes a terminal cover. The terminal cover is configured to cover the terminal.

In one or more embodiments of the present disclosure, the second assembly member further includes a real-time clock. The real-time clock is electrically connected to the circuit board.

Through the configuration above, the image of the display area of the volume value of the fluid volume meter can be captured by the image-capturing piece, so as to achieve the function of digitalization of the volume value of the fluid volume meter. During the period of image capture, since the brightness condition inside the casing body of the volume meter auxiliary module is controllable, the image capture can be carried out under the condition of stable lighting, which can prevent the situation of insufficient brightness or overexposure. Moreover, the user can confirm the volume value by directly observing the display area of the volume value through opening the cover. Thus, the effect of the digitalization of the volume value of the mechanical fluid volume meter is achieved under the condition that replacement of elements is eliminated.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
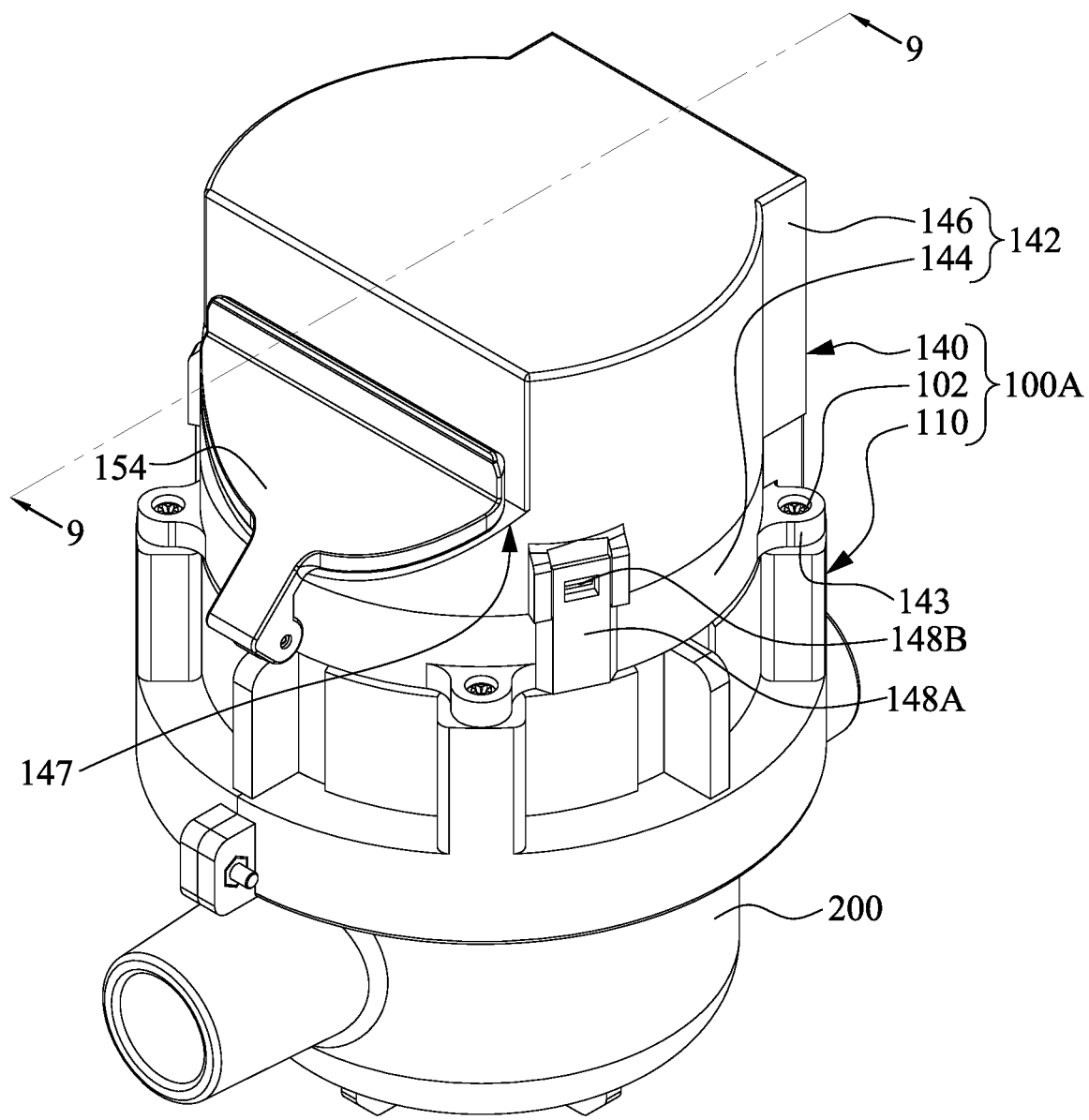
FIG. 1 is a schematic view of a volume meter auxiliary module assembled on a fluid volume meter according to the first embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that, although the terms first, second, third etc. may be used herein to describe various elements, components, regions, layers and/or sections, these elements, components, regions, layers and/or sections should not be limited by these terms. Further, the term "substantially" in the present disclosure refers to the fact that embodiments having any tiny variation or modification not affecting the essence of the technical features can be included in the scope of the present disclosure. For example, the term "substantially" means a stated value with a standard deviation, such as being in a range of ±20%, ±10%, or ±5%.

Figure 2:
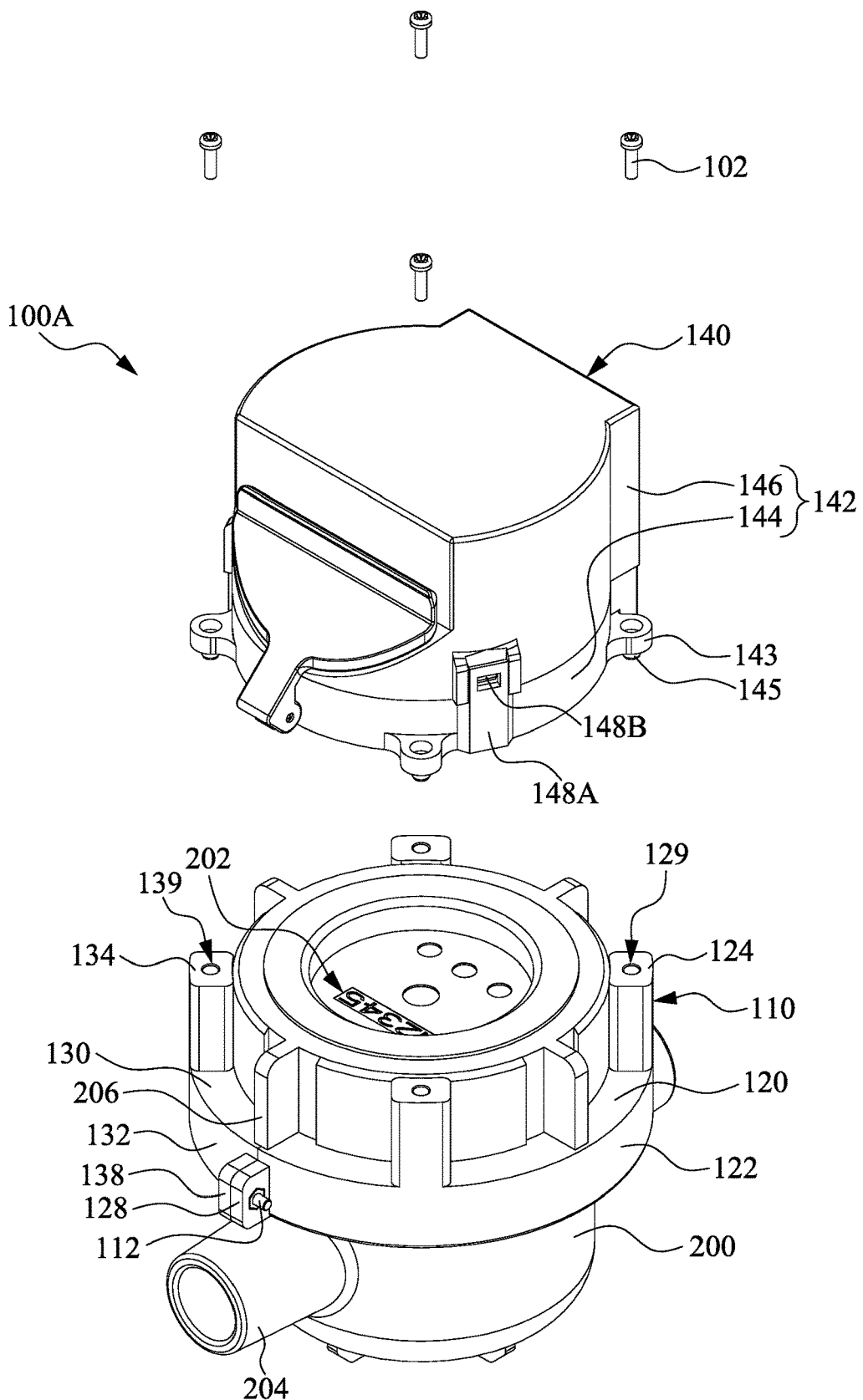
FIG. 2 is an exploded view of the volume meter auxiliary module of FIG. 1.

The volume meter auxiliary module of the present disclosure can be assembled on a fluid volume meter, facilitating the observation of the volume value of the fluid volume meter by the user. The volume meter auxiliary module also provides the function of image capture for the fluid volume meter, in order to digitalize the volume value of the fluid volume meter. Reference is made to FIG. 1 and FIG. 2. FIG. 1 is a schematic view of a volume meter auxiliary module 100A assembled on a fluid volume meter 200 according to the first embodiment of the present disclosure. FIG. 2 is an exploded view of the volume meter auxiliary module 100A of FIG. 1. The volume meter auxiliary module 100A of the present disclosure can be assembled on the fluid volume meter 200, in which the fluid volume meter 200 can be a water meter or a gas meter. Taking FIG. 1 as an example, the fluid volume meter 200 illustrated is a mechanical water meter.

The volume meter auxiliary module 100A includes a locking piece 102, a first assembly member 110 and a second assembly member 140. The first assembly member 110 is of a ring shape, and surrounds the sidewall of the fluid volume meter 200 in order to clamp the fluid volume meter 200. The second assembly member 140 covers on the first assembly member 110 and the fluid volume meter 200, and is assembled on the first assembly member 110 by the locking piece 102. After the second assembly member 140 is assembled on the top of the fluid volume meter 200, the second assembly member 140 covers the display area of the volume value 202 of the fluid volume meter 200.

Figure 3:
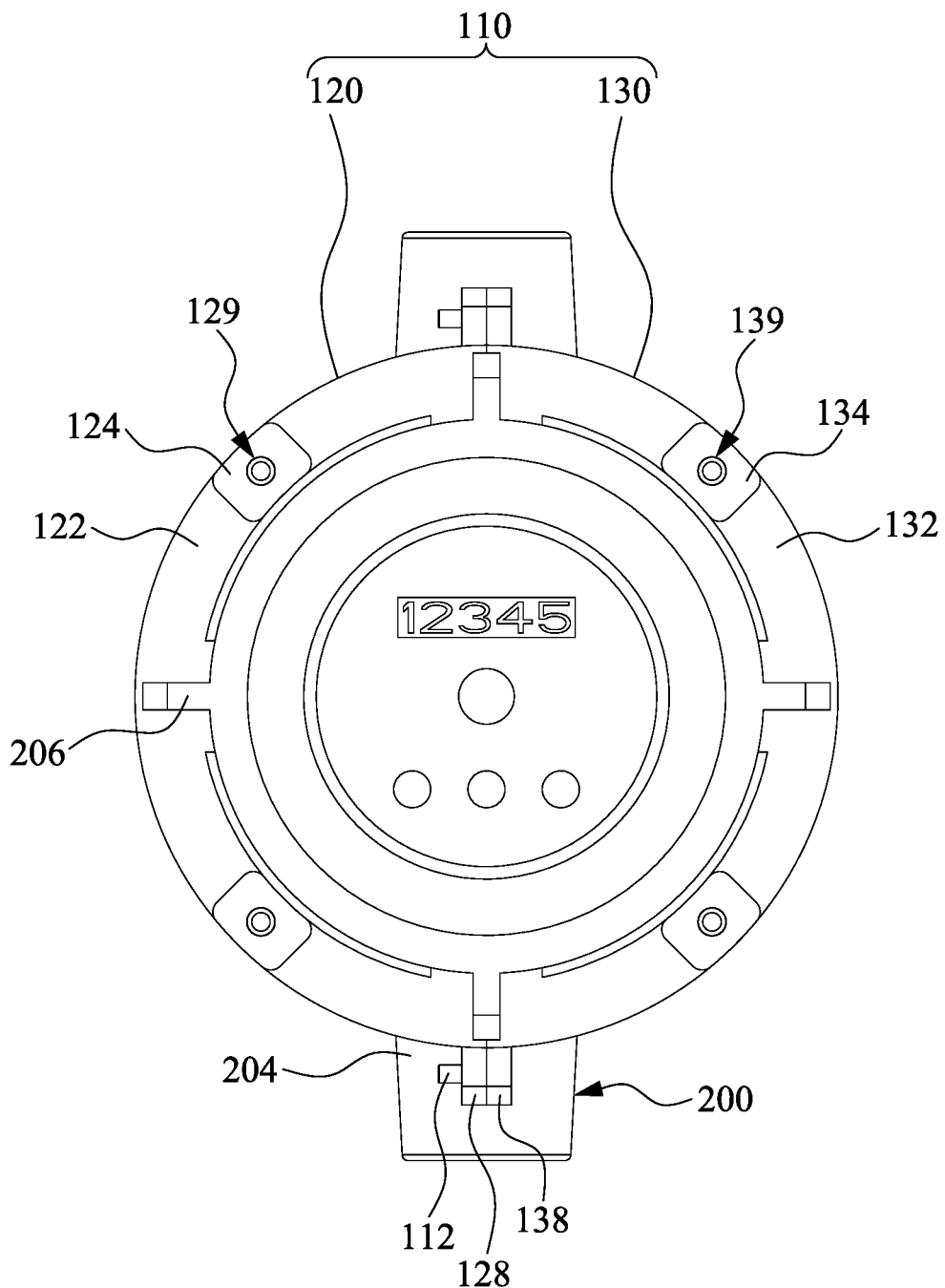
FIG. 3 is a top view of the fluid volume meter and the first assembly member of FIG. 2.
Figure 4:
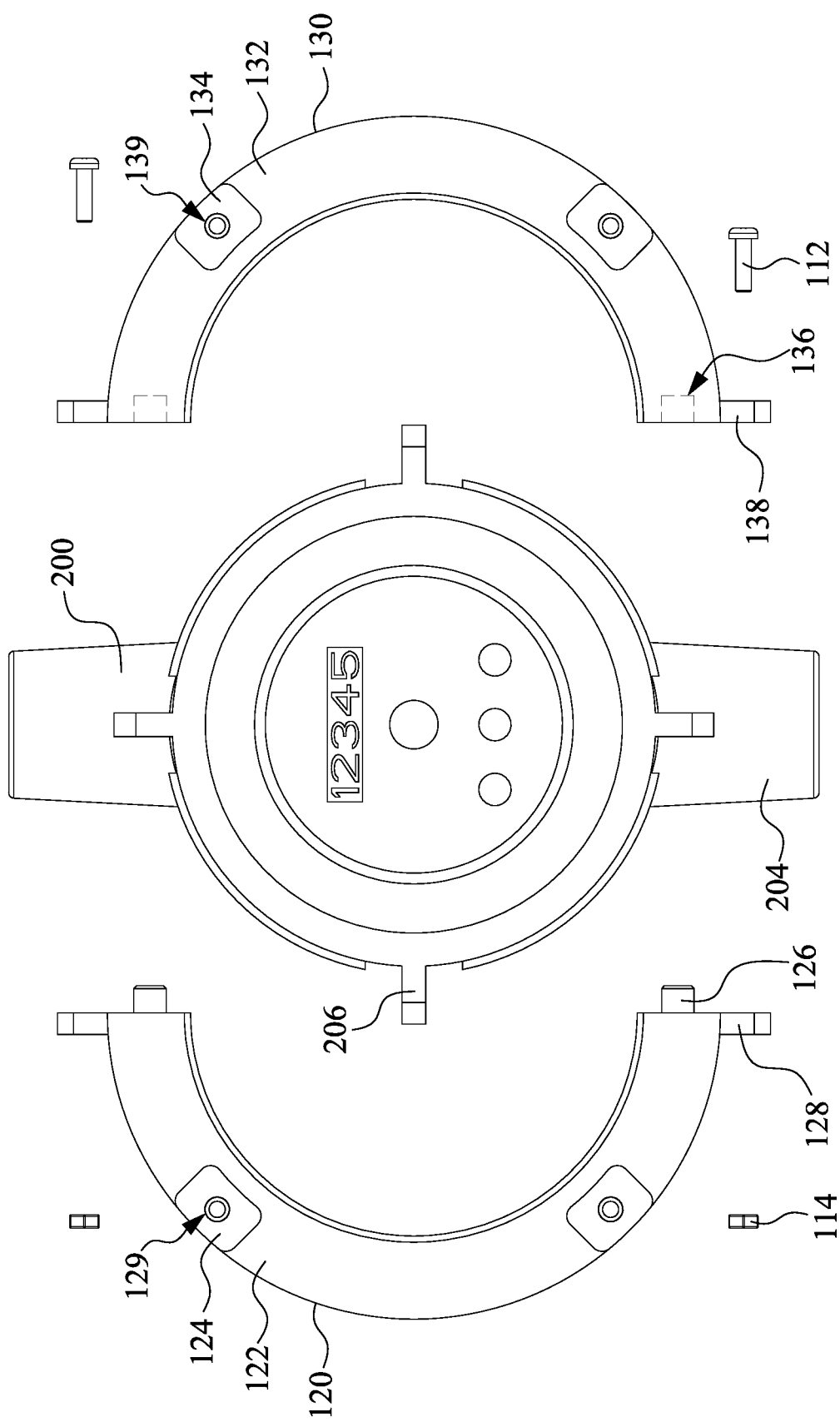
FIG. 4 is an exploded view of the first assembly member of FIG. 3.

Reference is made to FIG. 2, FIG. 3 and FIG. 4. FIG. 3 is a top view of the fluid volume meter 200 and the first assembly member 110 of FIG. 2. FIG. 4 is an exploded view of the first assembly member 100 of FIG. 3. The first assembly member 110 includes a locking screw 112, a nut 114, a first clamping piece 120 and a second clamping piece 130.

The first clamping piece 120 includes a first base 122, a first frame 124, a protruding portion 126 and a first connecting portion 128. The first base 122 can be designed to be of an arc shape, such that the first base 122 is suitable to surround the curved sidewall of the fluid volume meter 200. The first frame 124 is connected with the first base 122, and has a first locking hole 129. The protruding portion 126 is disposed at the two ends of the first base 122. The first connecting portion 128 is disposed on the outer wall of the first base 122.

The second clamping piece 130 includes a second base 132, a second frame 134, a recess portion 136 and a second connecting portion 138. The second base 132 can be designed to be of an arc shape, such that the second base 132 is suitable to surround the curved sidewall of the fluid volume meter 200. The shapes of the first base 122 and the second base 132 can be mutually symmetrical, such as in the shape of an arc extending along the same curved locus. The second frame 134 is connected with the second base 132, and has a second locking hole 139. The recess portion 136 is disposed at the two ends of the second base 132, and the dimensions of the recess portion 136 correspond to the dimensions of the protruding portion 126. The second connecting portion 138 is disposed on the outer wall of the second base 132.

The first clamping piece 120 and the second clamping piece 130 can be assembled together, and the fluid volume meter 200 is located between the first clamping piece 120 and the second clamping piece 130 after they are assembled together. To be specific, after the assembly, the first base 122 of the first clamping piece 120 and the second base 132 of the second clamping piece 130 can be mutually connected, in order to form a clamping structure, and the clamping structure can surround the fluid volume meter 200. Under the condition that the first base 122 and the second base 132 are in the shape of an arc extending along the same curved locus, the clamping structure is of a ring shape. However, this does not intend to limit the present disclosure. In other embodiments, the first base 122 and the second base 132 can be formed from extension along the same straight locus, forming a rectangular shape after assembly. The protruding portion 126 of the first clamping piece 120 is configured to be embedded into the recess portion 136 of the second clamping piece 130. In the process of assembly, through embedding the protruding portion 126 into the recess portion 136, the alignment between the first clamping piece 120 and the second clamping piece 130 can be facilitated. The first connecting portion 128 contacts the second connecting portion 138, and they together have a hole for the locking screw 112 to pass through. The nut 114 can be sleeved on the locking screw 112 and is located in the hole, in order to fix the connection between the first connecting portion 128 and the second connecting portion 138. In other embodiments, the methods of buckling, riveting and magnetic attraction can be adopted between the first connecting portion 128 and the second connecting portion 138 in order to fix the first connecting portion 128 and the second connecting portion 138.

In addition, the assembly position of the first clamping piece 120 and the second clamping piece 130 is designed corresponding to the structure of the fluid volume meter 200. For example, under the condition that the fluid volume meter 200 includes a pipeline 204 and a protruding sheet 206, the clamping structure formed from the first clamping piece 120 and the second clamping piece 130 is assembled between the pipeline 204 and the protruding sheet 206. By the pipeline 204 and the protruding sheet 206, the first clamping piece 120 and the second clamping piece 130 are prevented from detaching from the fluid volume meter 200.

Reference is made to FIG. 1 and FIG. 2 again. The second assembly member 140 includes a casing body 142 and a locking portion 143, in which the casing body 142 includes a lower subsidiary casing body 144 and an upper subsidiary casing body 146, and the lower subsidiary casing body 144 is located between the first assembly member 110 and the upper subsidiary casing body 146. The locking portion 143 is connected with the lower subsidiary casing body 144 of the casing body 142. The locking portion 143 has an alignment key 145, in which the alignment key 145 is a protruding point corresponding to the first locking hole 129 and the second locking hole 139. In the process of assembly, when the second assembly member 140 is disposed on the first assembly member 110, the alignment key 145 can be placed inside the first locking hole 129 and the second locking hole 139 first, for the sake of alignment. After alignment is completed, the locking portion 143 can respectively cover on the first frame 124 and the second frame 134. The locking piece 102 is configured to pass through the locking portion 143 and the alignment key 145, and the locking portion 143 is fixed on the first frame 124 and the second frame 134. To be specific, after the locking piece 102 passes through the locking portion 143 and the alignment key 145, the locking piece 102 is locked inside the first locking hole 129 and the second locking hole 139, in order to assemble the first assembly member 110 and the second assembly member 140 together. In other embodiments, the method of buckling can be adopted to assemble the first assembly member 110 and the second assembly member 140 together.

Apart from the function of locking, the first locking hole 129 and the second locking hole 139 respectively designed to have the shape of a hole can provide the function of connecting with other structural components. Since the second assembly member 140 is assembled on the first assembly member 110, when the first assembly member 110 assembled on the fluid volume meter 200 is not located at the expected location because of rotation, a dislocation of the second assembly member 140 relative to the fluid volume meter 200 will be caused. Correspondingly, the first locking hole 129 and the second locking hole 139 can be used to place a calibration fixture. Through the calibration to the first assembly member 110 by the calibration fixture in advance, the dislocation of the second assembly member 140 can then be prevented.

Figure 5:
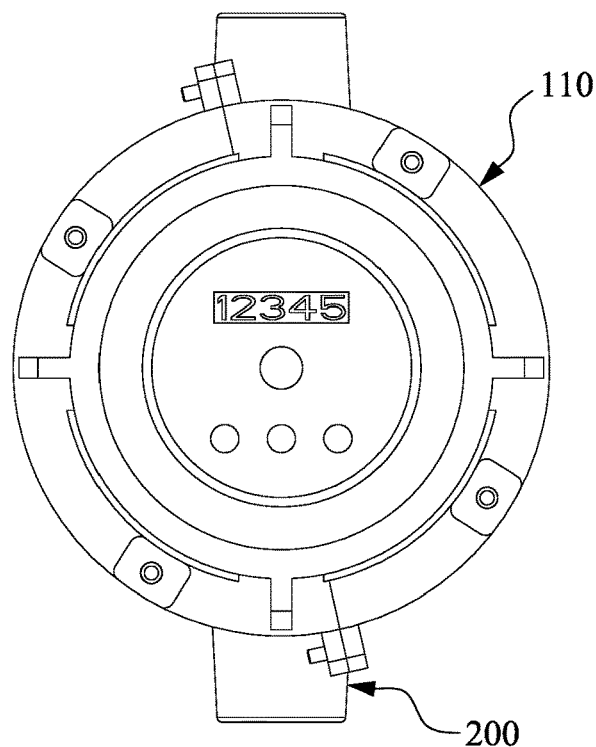
FIG. 5 is a top view of the first assembly member after rotation relative to the fluid volume meter.
Figure 6:
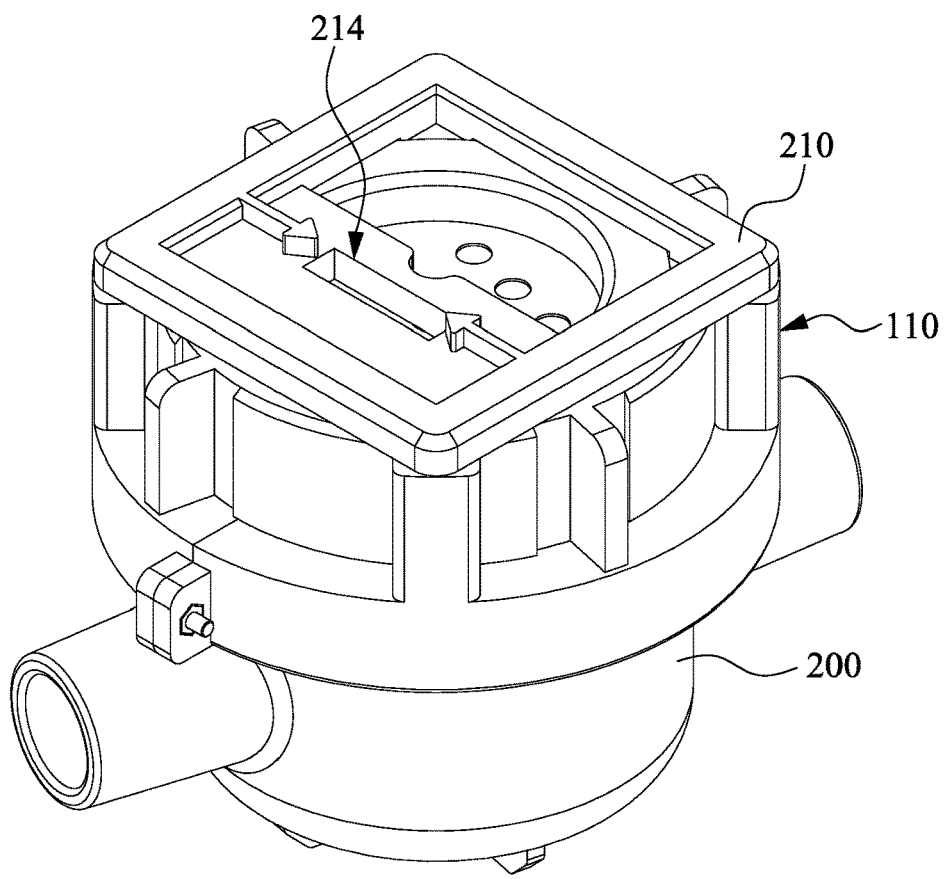
FIG. 6 and FIG. 7 are respectively a schematic view and a top view of a calibration fixture assembled on the first assembly member.
Figure 7:
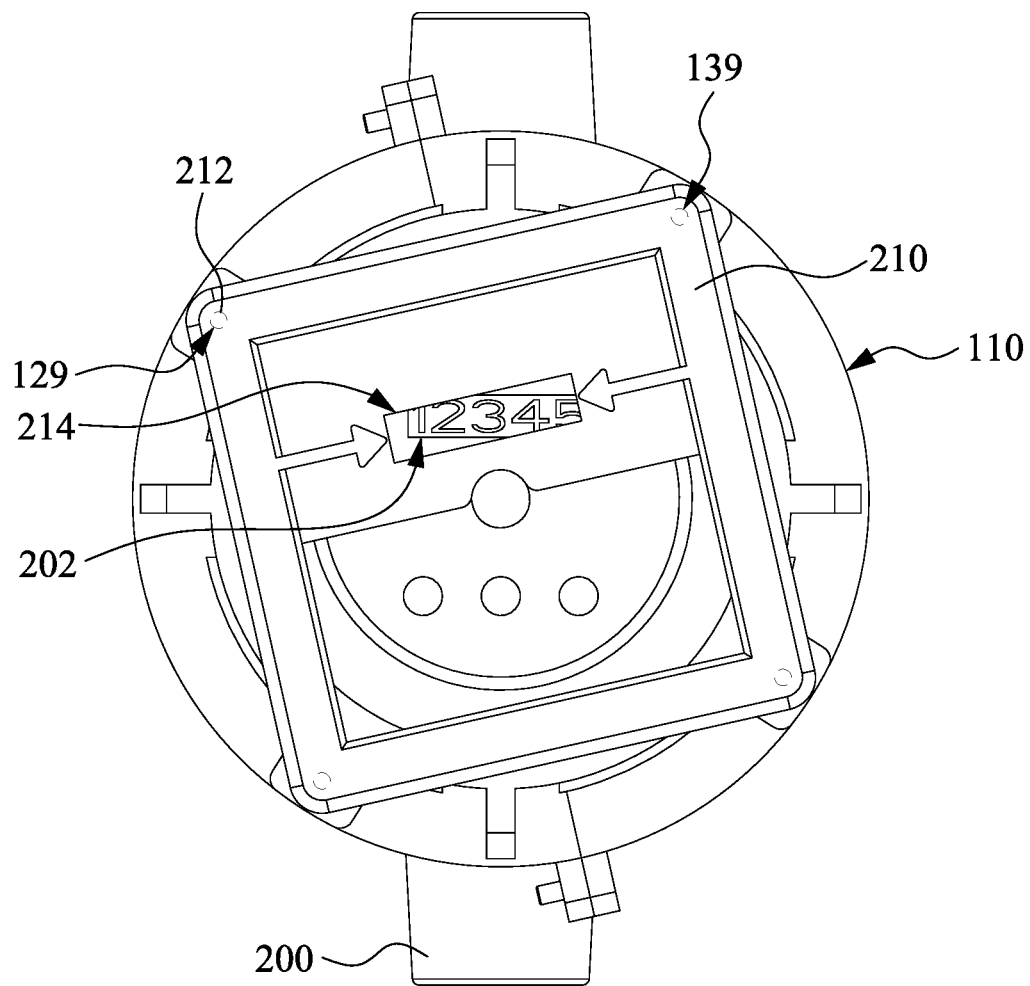
Figure 8:
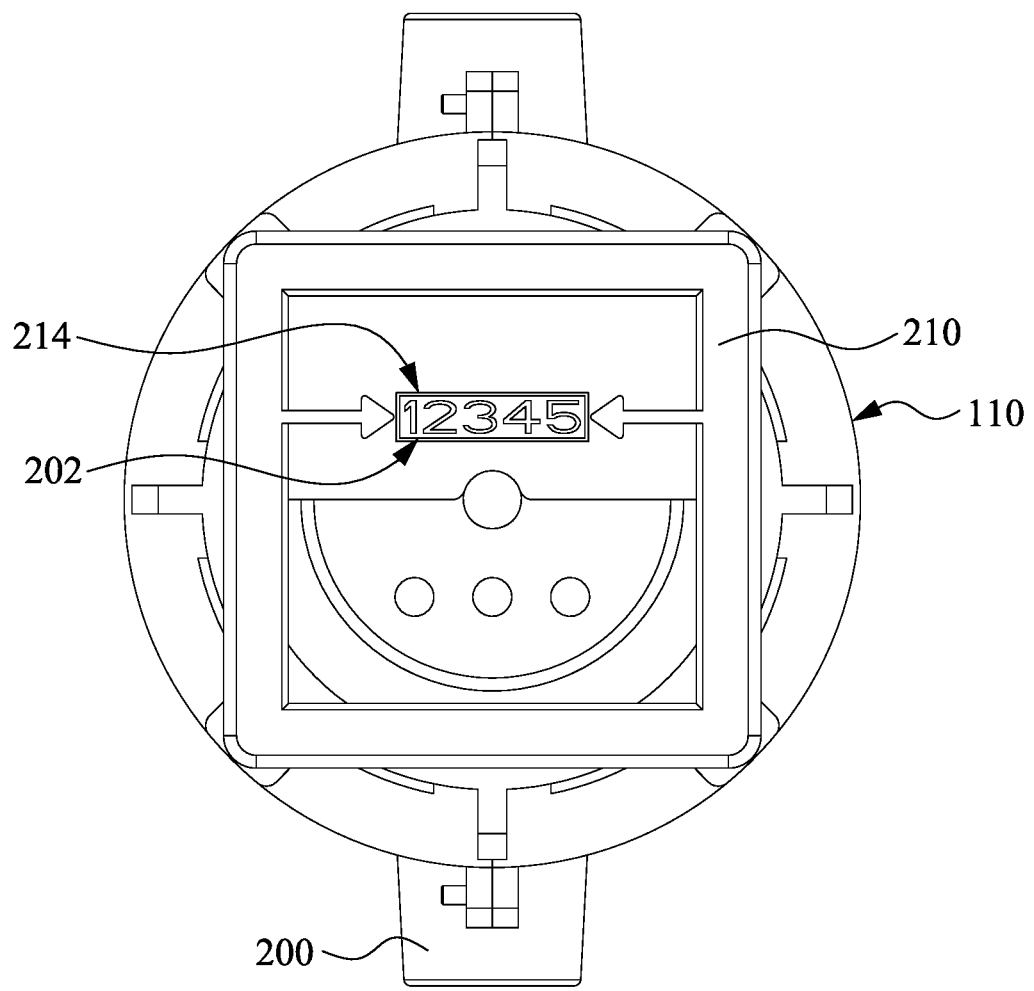
FIG. 8 is a top view after calibration is carried out by using the calibration fixture.

For example, please refer to FIG. 3 and FIG. 5. FIG. 5 is a top view of the first assembly member 110 after rotation relative to the fluid volume meter 200, and the first assembly member 110 of FIG. 5 rotates anti-clockwise relative to the first assembly member 110 of FIG. 3. The first assembly member 110 of FIG. 3 is defined to be locating at the expected location. The first assembly member 110 of FIG. 5 is regarded as not locating at the expected location. Please also refer to FIG. 6 and FIG. 7 at the same time. FIG. 6 and FIG. 7 are respectively a schematic view and a top view of a calibration fixture 210 assembled on the first assembly member 110. Before the first assembly member 110 is located at the expected location, the protruding key 212 of the calibration fixture 210 can be embedded into the first locking hole 129 and the second locking hole 139, in order to assemble the calibration fixture 210 on the first assembly member 110. The calibration fixture 210 has an observation window 214, such that the user can conveniently recognize whether the display area of the volume value 202 of the fluid volume meter 200 is blocked through the observation window 214. Taking FIG. 7 as an example, the display area of the volume value 202 of the fluid volume meter 200 is recognized to be blocked. At this point, the user can rotate the first assembly member 110, such that the first assembly member 110 is located at the expected location relative to the fluid volume meter 200, as shown in FIG. 8, in which FIG. 8 is a top view after calibration is carried out by using the calibration fixture 210. When rotating the first assembly member 110 to make the first assembly member 110 to be located at the expected location relative to the fluid volume meter 200, the entire display area of the volume value 202 can be viewed through the observation window 214 of the calibration fixture 210. Therefore, after calibration by the calibration fixture 210, the dislocation relative to the fluid volume meter 200 of the second assembly member 140 assembled on the first assembly member 110 can then be prevented.

Figure 9:
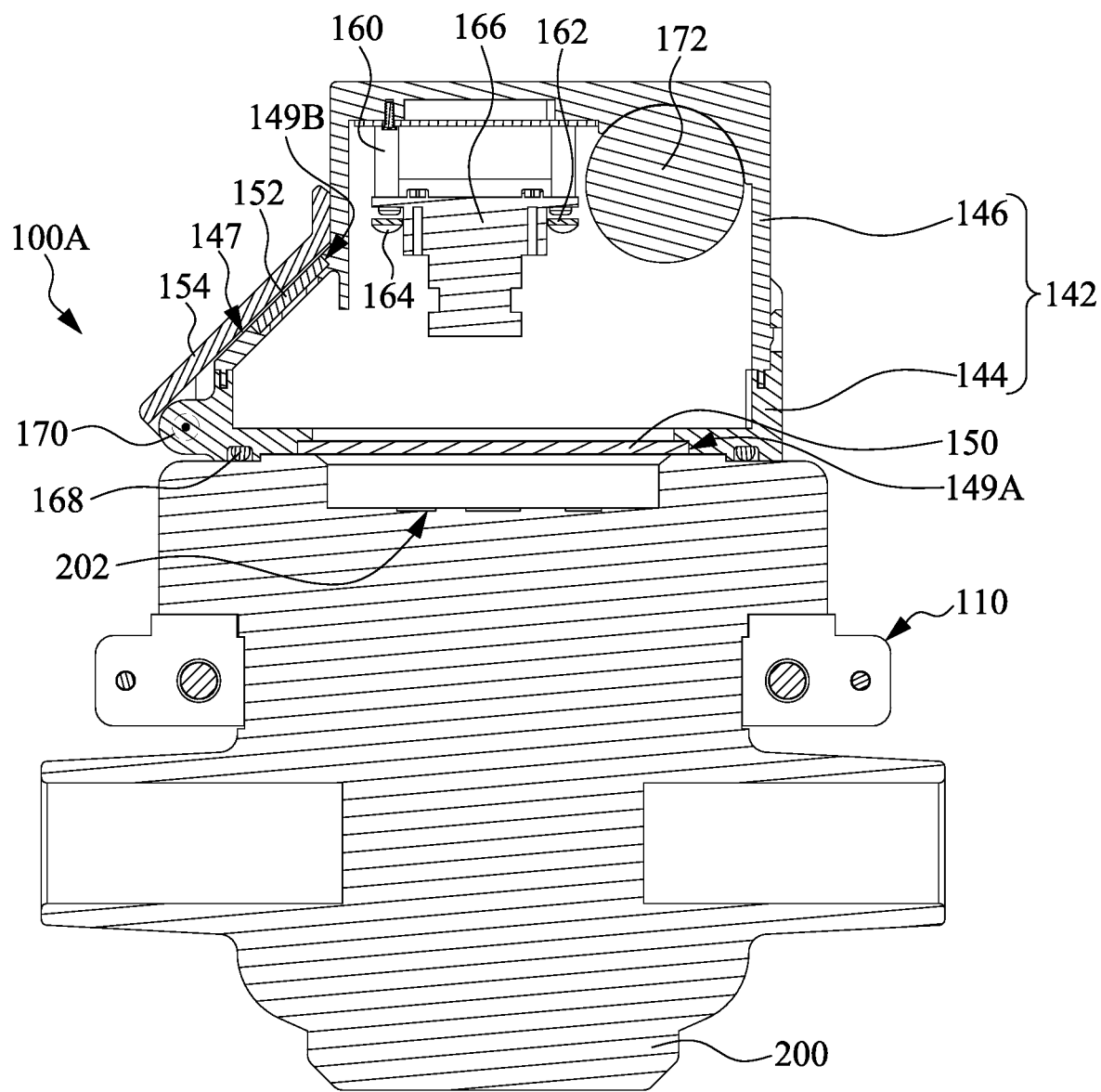
FIG. 9 is a sectional view of the volume meter auxiliary module and the fluid volume meter located underneath of FIG. 1, which is illustrated along the sectional line 9-9 of FIG. 1.

Please refer to FIG. 1 and FIG. 9. FIG. 9 is a sectional view of the volume meter auxiliary module 100A and the fluid volume meter 200 located underneath of FIG. 1, which is illustrated along the sectional line 9-9 of FIG. 1. For the sake of easy understanding of the content of FIG. 9, the corresponding elements and structures of FIG. 9 are illustrated with hatch lines. As shown in FIG. 9, the second assembly member 140 further includes a first light-transmitting sheet 150, a second light-transmitting sheet 152, a cover 154, a connecting base 160, a circuit board 162, a light emitter 164, an image-capturing piece 166 and a water-proof gasket 168.

The upper subsidiary casing body 146 is detachably assembled at the lower subsidiary casing body 144. To be specific, the lower subsidiary casing body 144 includes a first buckling portion 148A. The upper subsidiary casing body 146 includes a second buckling portion 148B. The lower subsidiary casing body 144 and the upper subsidiary casing body 146 can be mutually buckled to assemble together through the first buckling portion 148A and the second buckling portion 148B. The lower subsidiary casing body 144 and the upper subsidiary casing body 146 respectively has a first opening 149A and a second opening 149B, in which the first opening 149A is located at the bottom of the lower subsidiary casing body 144. The upper subsidiary casing body 146 has an inclined surface 147, and the second opening 149B is located at the inclined surface 147. The first light-transmitting sheet 150 and the second light-transmitting sheet 152 are respectively disposed inside the first opening 149A and the second opening 149B, in order to prevent water, water vapor or dust from entering into the casing body 142 from the outside of the casing body 142. The material of the first light-transmitting sheet 150 and the second light-transmitting sheet 152 can be glass, plastic or acrylic. Moreover, the water-proof gasket 168 is configured to be placed at the bottom of the casing body 142, and located between the fluid volume meter 200 and the casing body 142. The water-proof gasket 168 surrounds the first opening 149A. The water-proof gasket 168 is elastic. Under the condition that the water-proof gasket 168 is compressed between the fluid volume meter 200 and the casing body 142, the water-proof gasket 168 is able to prevent the water, water vapor or dust from the outside from entering through the gap between the fluid volume meter 200 and the casing body 142, thus providing a good effect of water-proof and dust-proof. In this embodiment, the water-proof gasket 168 can be an O-ring or a sealant strip made from rubber. In other embodiments, the water-proof gasket 168 can be implemented in the form of water-proof glue.

The cover 154 is disposed on the casing body 142 and is connected with the lower subsidiary casing body 144 of the casing body 142. The cover 154 extends from the lower subsidiary casing body 144 to the upper subsidiary casing body 146 to cover the inclined surface 147 of the upper subsidiary casing body 146. The cover 154 also covers the second opening 149B and the second light-transmitting sheet 152 disposed inside the second opening 149B. The cover 154 is rotatable relative to the casing body 142. For example, the connection region between the cover 154 and the lower subsidiary casing body 144 can be fixed by using component shaped as a rod, such that the cover 154 can take the rod-shaped component as an axis to rotate. Under the condition that the cover 154 extends from the lower subsidiary casing body 144 to the upper subsidiary casing body 146, it is convenient for the user to open the cover 154 from above. Moreover, the volume meter auxiliary module 100A further includes an elastic piece 170 connecting from the cover 154 to the casing body 142, and the restoring force of the elastic piece 170 is used to attach the cover 154 on the inclined surface 147. For example, the elastic piece 170 can be a spring. The casing body 142 and the cover 154 are made of opaque material, such that the casing body 142 and the cover 154 are capable of light-shielding. Under the condition that the cover 154 is attached on the inclined surface 147, the space inside the casing body 142 is light-shielded from the outside environment. Although the cover 154 in this embodiment is connected to the lower subsidiary casing body 144 by the rod-shaped component, this does not intend to limit the present disclosure. In other embodiments, the cover 154 can be connected to the upper subsidiary casing body 146 of the casing body 142 by the rod-shaped component, and the cover 154 extends from the upper subsidiary casing body 146 to the lower subsidiary casing body 144 to cover the inclined surface 147 of the casing body 146, such that the user is allowed to open the cover 154 from below. In other embodiments, the cover 154 can be disposed in a rail, such that the user is allowed to operate the cover 154 through sliding.

The connecting base 160, the circuit board 162, the light emitter 164 and the image-capturing piece 166 are disposed inside the casing body 142, in which the connecting base 160 can be fixed on the inner wall of the casing body 146 by a fixing piece. The circuit board 162, the light emitter 164 and the image-capturing piece 166 are fixed on the connecting base 160, and the circuit board 162 is electrically connected with the light emitter 164 and the image-capturing piece 166. The circuit board 162 has an electric element capable to drive the light emitter 164 and the image-capturing piece 166. For example, the electric element can be an integrated circuit, a microcontroller, a microprocessor, an application specific processor (ASP), or the like. The light emitter 164 can be a light-emitting diode, including an organic light-emitting diode or an inorganic light-emitting diode, which can provide a light. The image-capturing piece 166 can be a lens module and includes a charge-coupled device (CCD). The focal position of the image-capturing piece 166 falls on the display area of the volume value 202 of the fluid volume meter 200. The image-capturing piece 166 can carry out image capture for the display area of the volume value 202 of the fluid volume meter 200, and the light emitter 164 provides lighting during the image capture by the image-capturing piece 166. Moreover, the upper subsidiary casing body 146 of the casing body 142 can have a groove to allow the accommodation of a battery 172, in which the battery 172 can be the power source of the circuit board 162, the light emitter 164 and the image-capturing piece 166.

Through the configuration above, the space inside the casing body 142 is suitable for the image-capturing piece 166 to carry out image capture, such that the situation of insufficient brightness or overexposure for the image captured can be prevented. Furthermore, since the casing body 142 is capable of light-shielding, the brightness condition inside the casing body 142 will have a higher relation with the lighting provided by the light emitter 164, and have a lower relation with the light from the environment outside. Under the condition that the lighting provided by the light emitter 164 is controllable, the brightness condition inside the casing body 142 is also controllable. Therefore, the image-capturing piece 166 can carry out image capture under the condition of stable lighting, which can prevent the situation of insufficient brightness or overexposure and increase the quality of the image. Moreover, the circuit board 162 could include a receiver and a transmitter. The receiver and the transmitter have the function of wireless communication, such as Bluetooth transmission, wireless network transmission, radio wave transmission and other wireless transmissions. When the receiver receives the requirement of image capture, the circuit board 162 drives the light emitter 164 and the image-capturing piece 166 to respectively provide lighting and carry out image capture, and the image captured is transmitted by the transmitter. Through the configuration above, the volume value of the of the fluid volume meter 200 can be recorded in a digital format, and the digitalization of the volume value can be completed.

Figure 10:
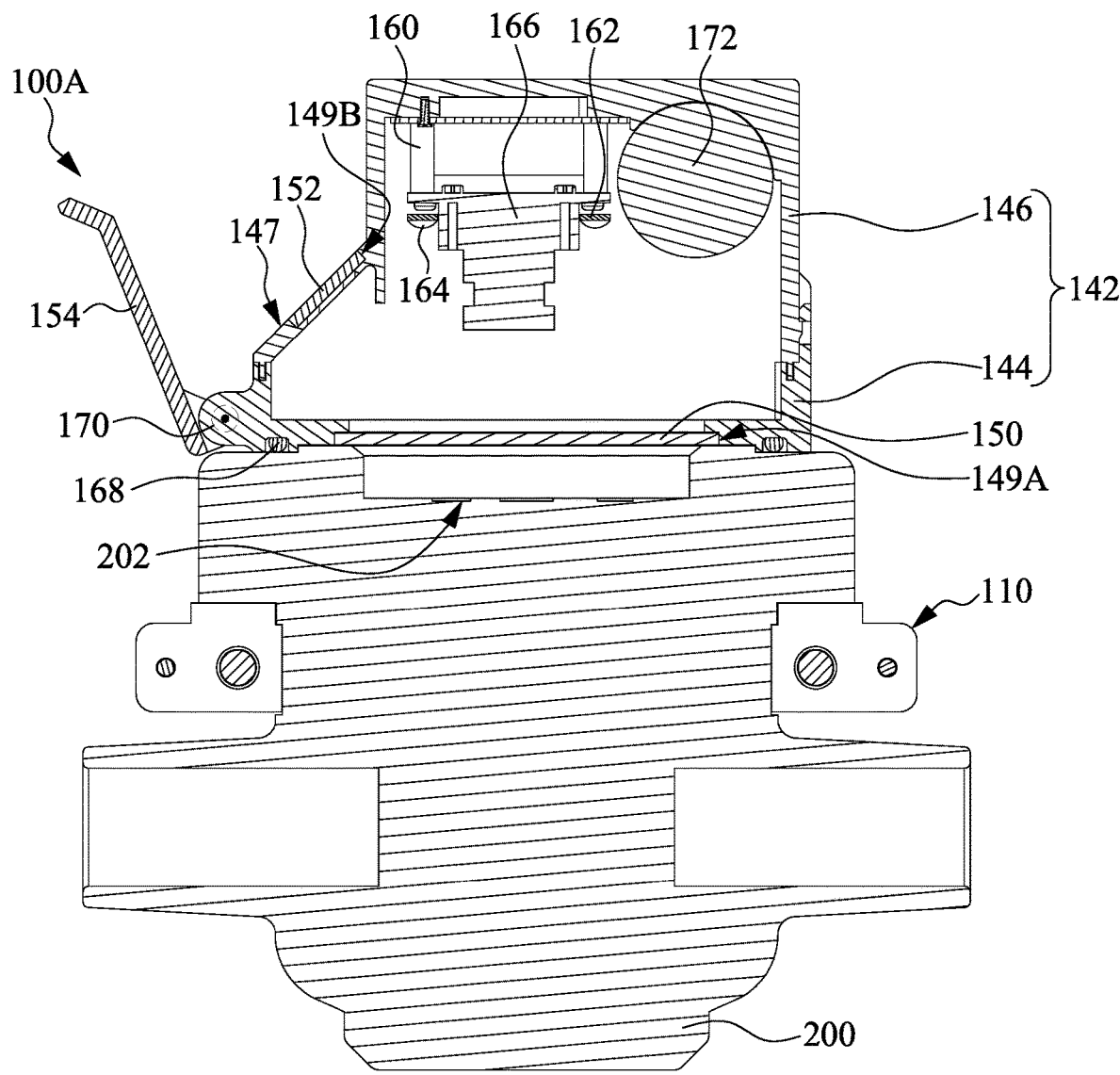
FIG. 10 and FIG. 11 are respectively a sectional view and a front view of the volume meter auxiliary module of FIG. 1 after the cover is opened.
Figure 11:
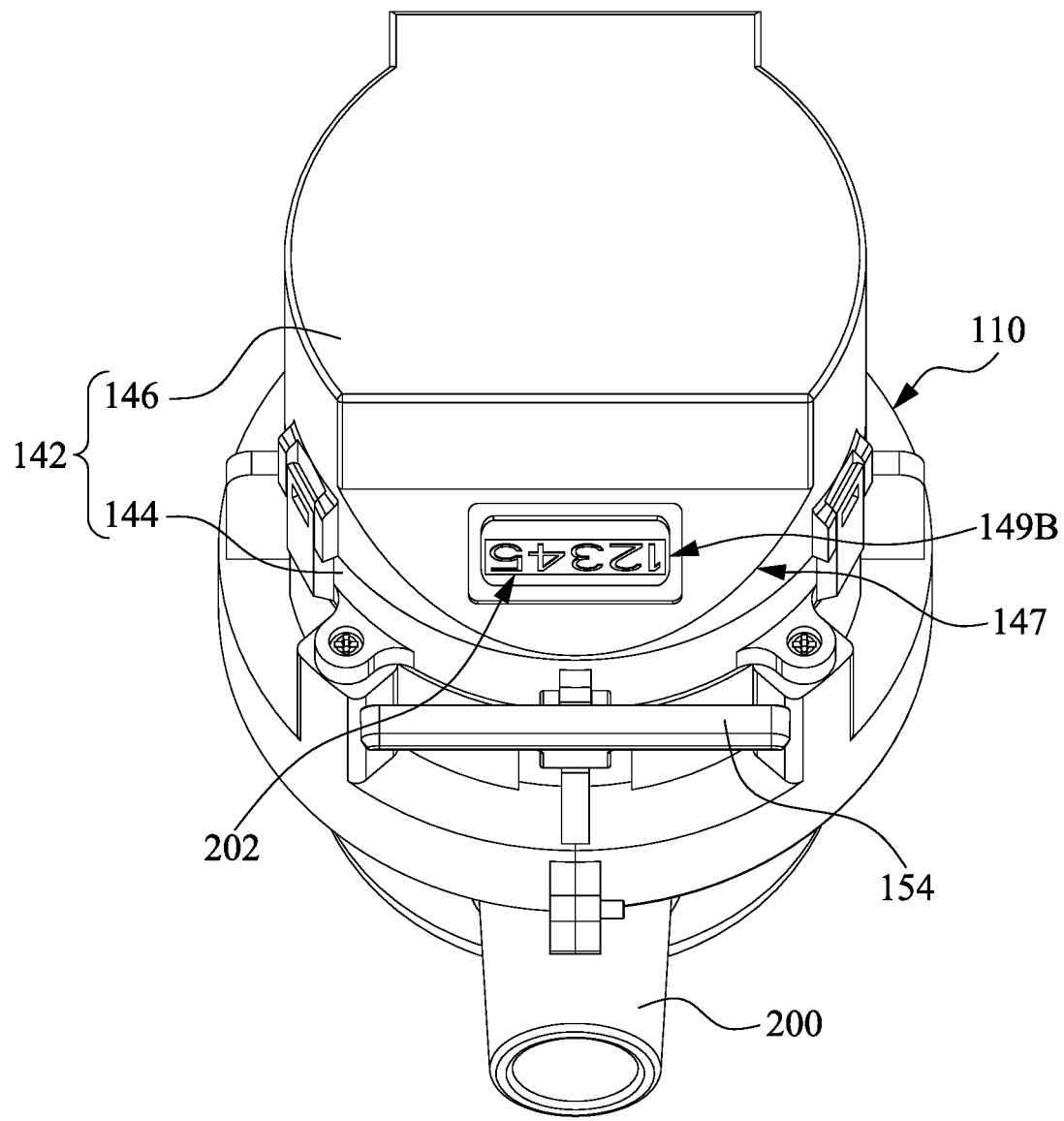

The configuration above can also allow the user to directly observe the volume value displayed at the display area of the volume value 202. Please refer to FIG. 10 and FIG. 11. FIG. 10 and FIG. 11 are respectively a sectional view and a front view of the volume meter auxiliary module 100A of FIG. 1 after the cover 154 is opened. Similarly, for the sake of easy understanding of the content of FIG. 10, the corresponding elements and structures of FIG. 10 are illustrated with hatch lines. After the cover 154 is opened, the user can view the display area of the volume value 202 of the fluid volume meter 200 through the second light-transmitting sheet 152 inside the second opening 149B and the first light-transmitting sheet 150 inside the first opening 149A, so as to confirm the volume value displayed at the display area of the volume value 202. In addition, the elastic piece 170 is disposed between the cover 154 and the casing body 142. Therefore, after the user confirms the volume value, the cover 154 recovers to cover the position on the inclined surface 147 and the second opening 149B by the elastic piece 170, such that the brightness condition inside the casing body 142 is maintained.

In other words, after the volume meter auxiliary module 100A is assembled on the fluid volume meter 200, apart from the digitalization of the volume value of the fluid volume meter 200 through the image-capturing piece 166, the user is allowed to directly observe the display area of the volume value 202 to confirm the volume value. Moreover, during the period of image capture, since the brightness condition inside the casing body 142 is controllable, the image-capturing piece 166 can carry out image capture under the condition of stable lighting, which can prevent the situation of insufficient brightness or overexposure.

In some of the embodiments, the second assembly member 140 further includes a light sensor (not shown), in which the light sensor can be disposed on the inclined surface 147. According to the sensing result of the light sensor, the cover 154 can be judged to be in the status of closing or opening, and the circuit board 162 can control the light emitter 164 according to the status of the cover 154. For example, the light emitter 164 can be set to be switched off when the cover 154 is opened, so as to save the use of electricity of the battery 172.

Figure 12:
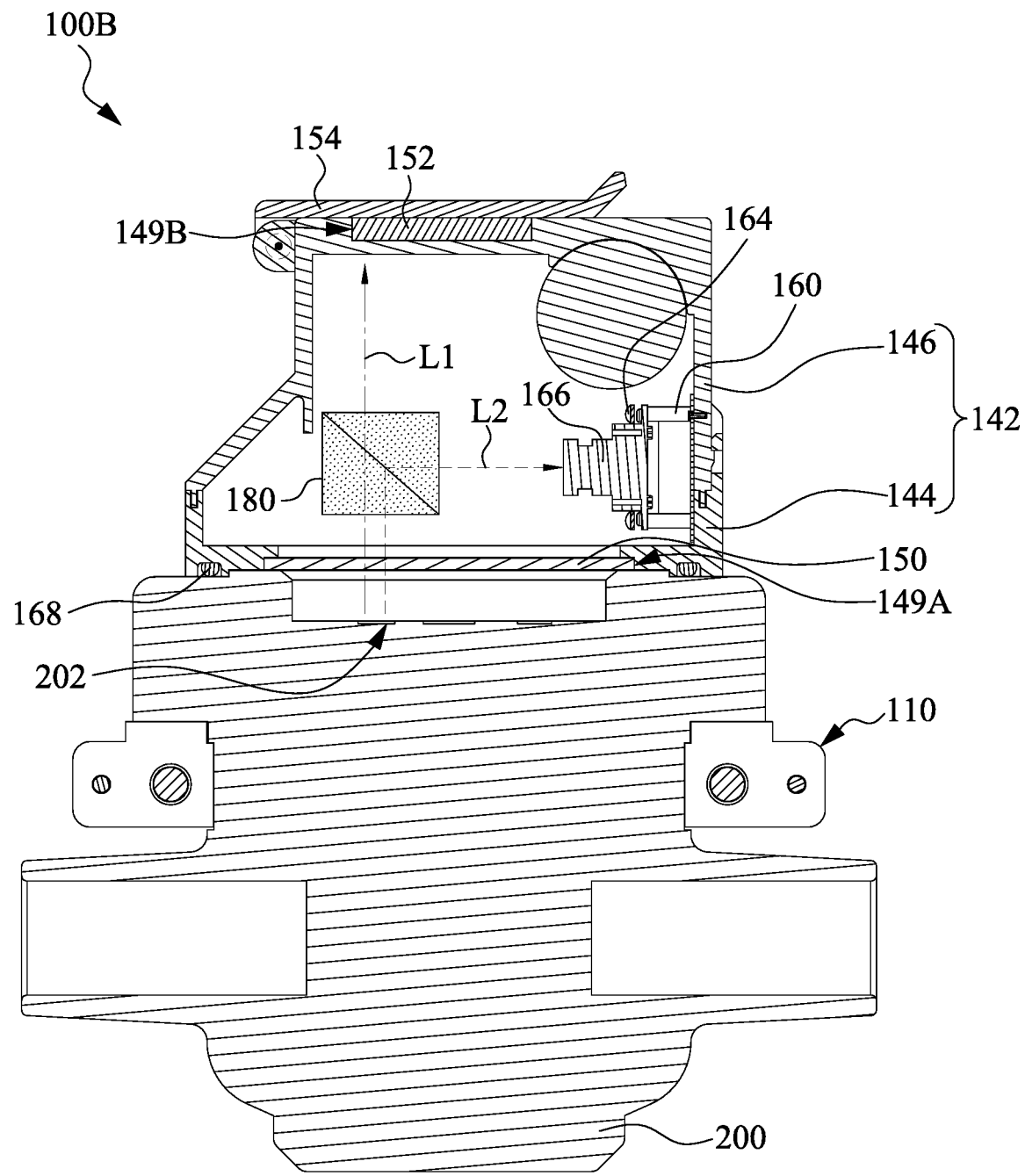
FIG. 12 is a sectional view of a volume meter auxiliary module assembled on a fluid volume meter according to the second embodiment of the present disclosure, with the view angle of section the same as FIG. 9.

Reference is made to FIG. 12. FIG. 12 is a sectional view of a volume meter auxiliary module 100B assembled on a fluid volume meter 200 according to the second embodiment of the present disclosure, with the view angle of section the same as FIG. 9. Similarly, for the sake of easy understanding of the content of FIG. 12, the corresponding elements and structures of FIG. 12 are illustrated with hatch lines. At least one difference between the second embodiment and the first embodiment is that, the volume meter auxiliary module 100B of the second embodiment further includes a light divider 180, and the light divider 180 is disposed inside the casing body 142.

The light divider 180 can be composed of two prisms, or formed from a metal coating on a prism. When the light emitter 164 provides lighting, a portion of the light reflected from the display area of the volume value 202 of the fluid volume meter 200 penetrates through the light divider 180, as shown by the light ray L1, and another portion will be reflected again by the light divider 180, as shown by the light ray L2. By this mechanism, the light reflected from the display area of the volume value 202 can be guided to the image-capturing piece 166 and thus the observing position of the user through the light divider 180.

To be specific, in this embodiment, the second opening 149B is located on the top surface of the upper subsidiary casing body 146. The cover 154 covers on the top surface and the second opening 149B. The light divider 180 is located between the display area of the volume value 202 of the fluid volume meter 200 and the cover 154. The light divider 180 optically couples between the display area of the volume value 202 of the fluid volume meter 200 and the cover 154. After the user opens the cover 154, the user can view the display area of the volume value 202 through the second light-transmitting sheet 152 inside the second opening 149B, the light divider 180 and the first light-transmitting sheet 150 inside the first opening 149A. The connecting base 160 is fixed on the sidewall of the upper subsidiary casing body 146, and the image-capturing piece 166 aligns with the light divider 180, such that the light divider 180 optically couples between the image-capturing piece 166 and the display area of the volume value 202 of the fluid volume meter 200. When the image-capturing piece 166 is driven, the image-capturing piece 166 can capture the image of the display area of the volume value 202 through the light divider 180. Through disposing the light divider 180 inside the casing body 142, the configuration of the elements inside the casing body 142 can be more flexible. The observing position of the user to the volume meter auxiliary module 100B can be adjusted, so as to match the configuration environment of the fluid volume meter 200.

Figure 13:
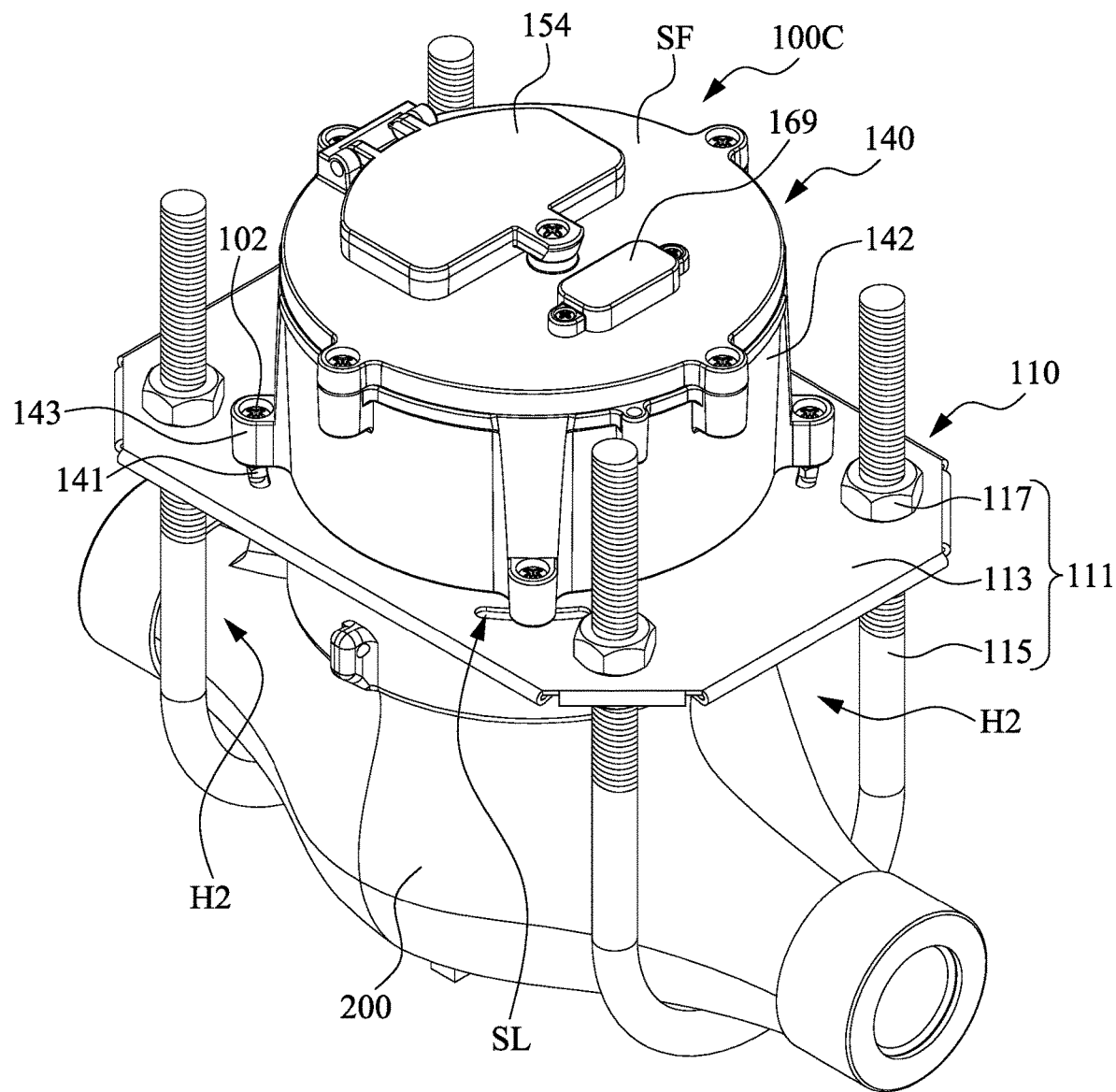
FIG. 13 is a schematic view of a volume meter auxiliary module assembled on a fluid volume meter according to the third embodiment of the present disclosure.

Reference is made to FIG. 13. FIG. 13 is a schematic view of a volume meter auxiliary module 100C assembled on a fluid volume meter 200 according to the third embodiment of the present disclosure. At least one difference of the third embodiment from the first and the second embodiments is the mechanism of how the first assembly member 110 is fixed to the fluid volume meter 200.

Figure 14:
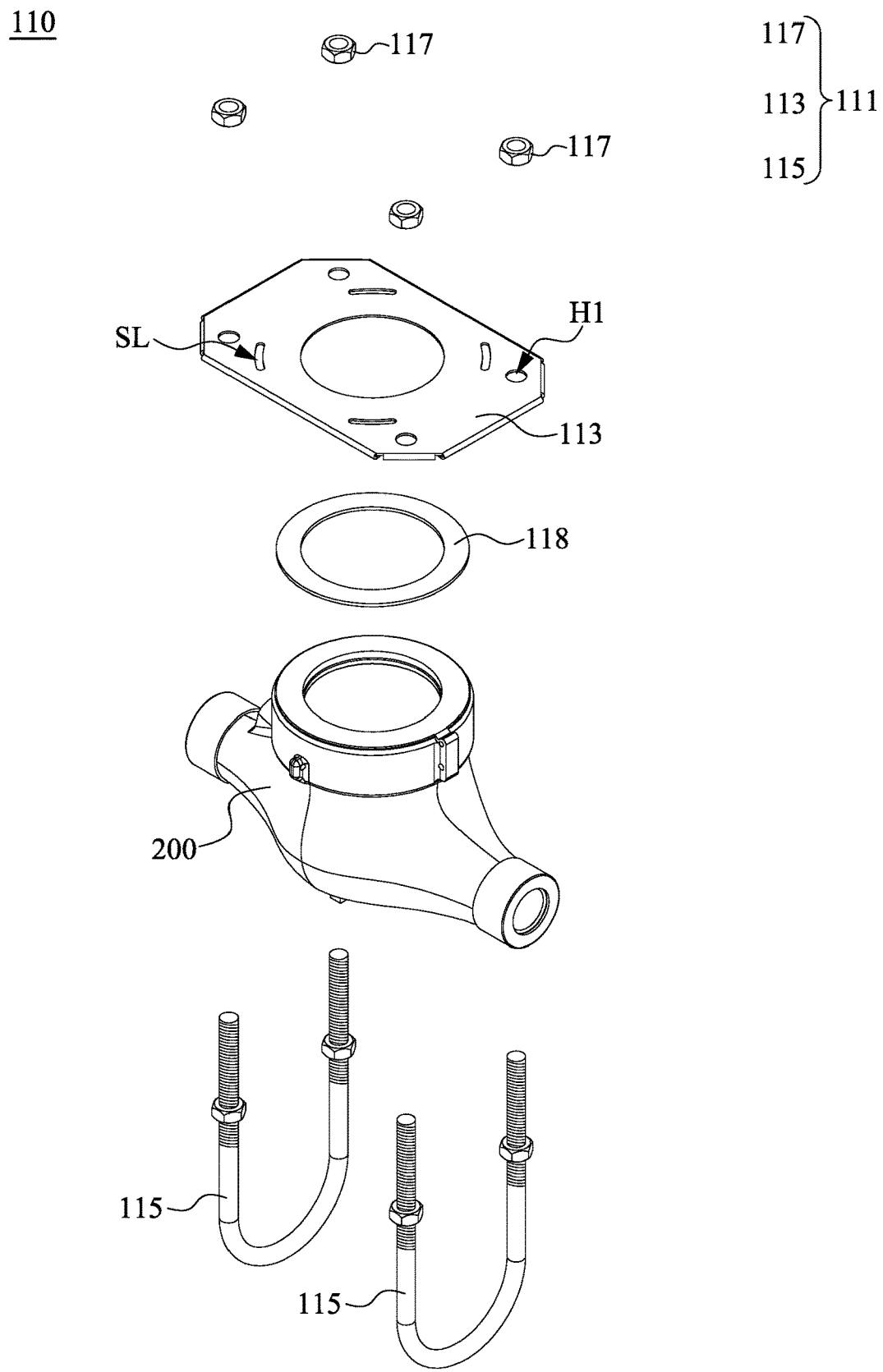
FIG. 14 is an exploded view of the first assembly member of FIG. 13.

Reference is made to FIG. 14. FIG. 14 is an exploded view of the first assembly member 110 of FIG. 13. In this embodiment, as shown in FIG. 13 and FIG. 14, the first assembly member 110 includes the clamping structure 111. The clamping structure 111 includes a platform 113, two holding components 115 and at least two first locking components 117. The platform 113 is configured to abut against the bottom of the casing body 142 of the second assembly member 140 and the top of the fluid volume meter 200. The platform 113 has a plurality of first through holes H1. Each of the holding components 115 is U-shaped. Each of the holding components 115 is configured to penetrate through two of the first through holes H1. To be specific, the two ends of each of the U-shaped holding components 115 respectively penetrate through the corresponding first through holes H1 of the platform 113. Each of the holding components 115 defines a second through hole H2 with the platform 113. To be specific, the space within the U-shaped region of each of the holding components 115 and bounded by the platform 113 defines the second through hole H2. By adjusting the amount of penetration of the ends of the U-shaped holding components 115 through the platform 113, the size of the second through holes H2 can be simply and easily controlled.

Furthermore, each of the second through holes H2 is configured to be penetrated through by a portion of the fluid volume meter 200. In practical applications, as shown in FIG. 13 and FIG. 14, the two portions of the fluid volume meter 200 which respectively penetrate the second through holes H2 are the inlet portion and the outlet portion of the fluid volume meter 200. As mentioned above, since the size of the second through holes H2 can be simply and easily controlled, the volume meter auxiliary module 100C can be securely assembled on a variety of the fluid volume meters with different dimensions and shapes.

In addition, the first locking components 117 are located on a side of the platform 113 abutting against the bottom of the casing body 142. The first locking components 117 are configured to be respectively locked to at least one end of each of the holding components 115. In practical applications, for example, the first locking components 117 are nuts and the ends of the holding components 115 are of screw rods. As shown in FIG. 13 and FIG. 14, the quantity of the nuts is four, and each of the nuts is locked to the corresponding screw rod. After the nuts are locked to the screw rods until the platform 113 pressing on the fluid volume meter 200, the relative position between the clamping structure 111 and the fluid volume meter 200 is secured.

Moreover, as shown in FIG. 14, the first assembly member 110 further includes a water-proof gasket 118. In this embodiment, the water-proof gasket 118 is located between the platform 113 and the fluid volume meter 200. Therefore, water or dust is prevented from entering through the gap between the platform 113 and the fluid volume meter 200.

Structurally speaking, the platform 113 has at least one curved slot SL. As shown in FIG. 13, the second assembly member 140 further includes at least one locking portion 143, at least one locking piece 102 and at least one second locking component 141. The locking portion 143 is connected with the casing body 142. The locking piece 102 is configured to penetrate through locking portion 143 and the curved slot SL. The second locking component 141 is located on a side of the platform 113 away from the second assembly member 140. The second locking component 141 is configured to be locked to the locking piece 102. In practical applications, for example, the second locking component 141 is a nut and the locking piece 102 is a screw. As shown in FIG. 13, the quantities of the second locking component 141, the locking piece 102 and the curved slot SL are respectively four. After the nuts are locked to the screws until the platform 113 pressing on the second assembly member 140, the relative position between the clamping structure 111 and the second assembly member 140 is secured.

In addition, the four curved slots SL are geometrically concentric and each of the curved slots SL extends along a circular path, such that the second assembly member 140 can be rotated relative to the clamping structure 111 for the sake of positioning after the locking pieces 102 penetrate through the corresponding curved slot SL. Since no additional tool is required for the positioning of the second assembly member 140 relative to the first assembly member 110, it is convenient for the user to assemble the second assembly member 140 and the first assembly member 110 together. In this embodiment, the quantity of the curved slots SL is four, but this does not intend to limit the present disclosure. In other embodiments, the quantity of the curved slots SL could be more than four or less than four.

As shown in FIG. 13, the second assembly member 140 has an operational surface SF. The operational surface SF of the second assembly member 140 is substantially parallel with the platform 113 of the first assembly member 110. The second opening 149B (please refer to FIG. 15 and FIG. 16) is located on the operational surface SF. In practical applications, a light-transmitting sheet 153, such as a piece of glass, plastic or acrylic, is disposed at the second opening 149B. The cover 154 is pivotally connected to the operational surface SF of the second assembly member 140 and the cover 154 covers the second opening 149B.

Figure 15:
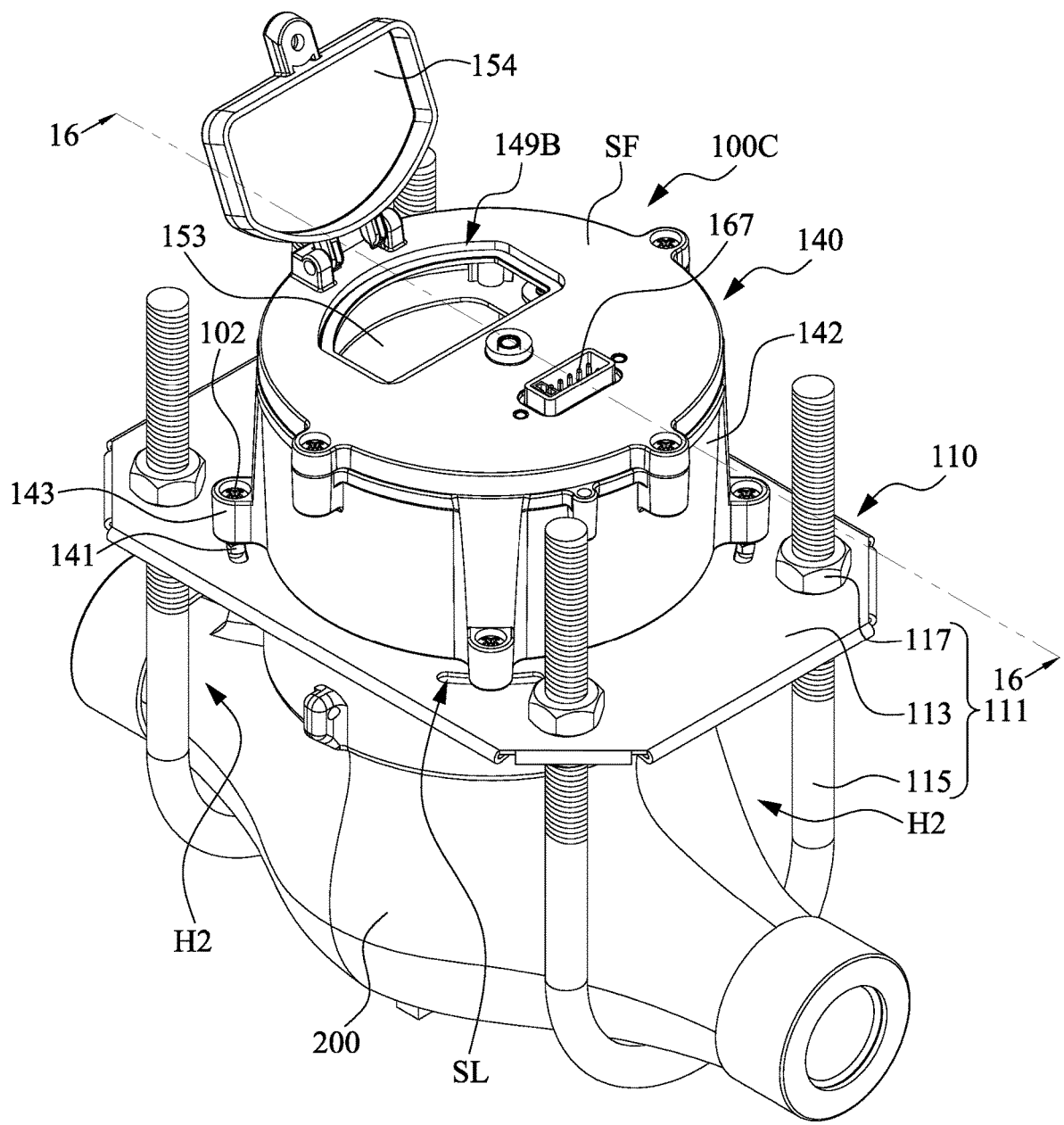
FIG. 15 a schematic view of the volume meter auxiliary module of FIG. 13, in which the cover is opened and the terminal cover is removed.

Reference is made to FIG. 15. FIG. 15 FIG. 15 a schematic view of the volume meter auxiliary module 100C of FIG. 13, in which the cover 154 is opened and a terminal cover 169 (please refer to FIG. 13) is removed. The description about the terminal cover 169 is illustrated in the subsequent paragraphs. In this embodiment, as shown in FIG. 15, after the cover 154 is rotated and opened, the user can conveniently and directly observe the display area of the volume value 202 (please refer to FIG. 2) of the fluid volume meter 200 through the second opening 149B of the second assembly member 140, provided that the second opening 149B is designed to align with the volume value 202 of the fluid volume meter 200.

Figure 16:
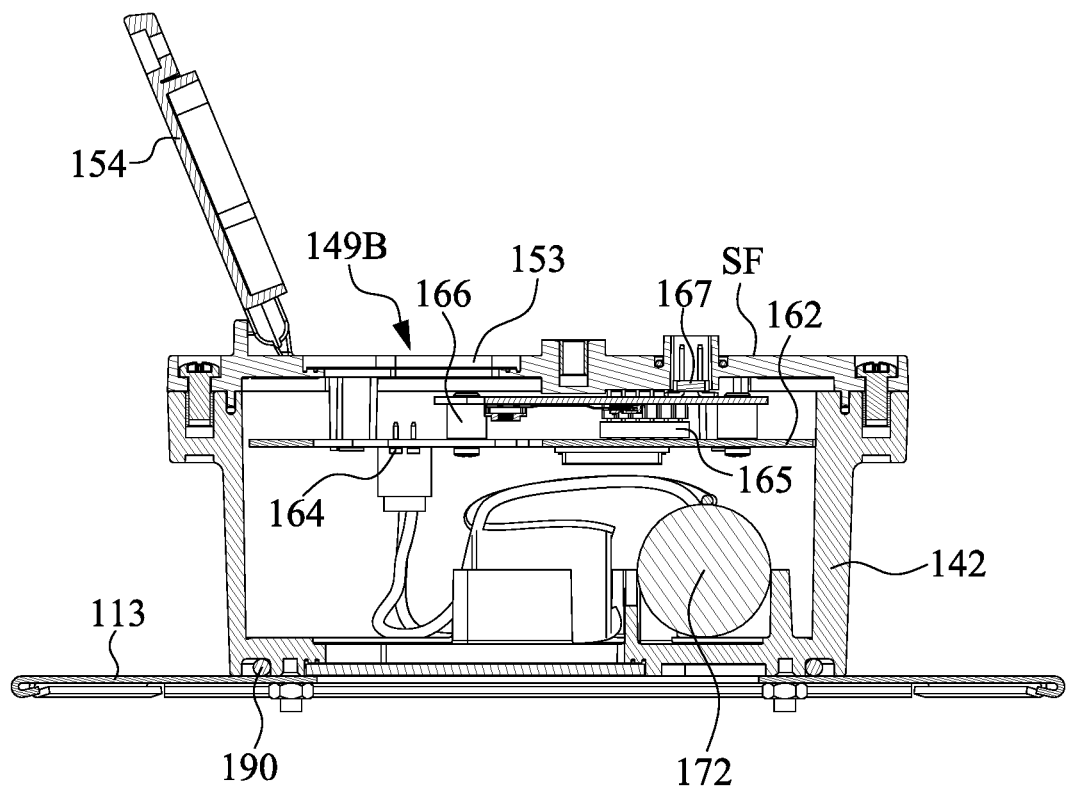
FIG. 16 is a sectional view of the second assembly member of FIG. 15, which is illustrated along the sectional line 16-16 of FIG. 15.

Reference is made to FIG. 16. FIG. 16 is a sectional view of the second assembly member 140 of FIG. 15, which is illustrated along the sectional line 16-16 of FIG. 15. In this embodiment, as shown in FIG. 16, the second assembly member 140 further includes a circuit board 162, a battery 172 and a terminal 167. The circuit board 162 is disposed inside the casing body 142. The circuit board 162 is electrically connected with the light emitter 164 and the image-capturing piece 166. The battery 172 is configured to electrically connect with the circuit board 162. The terminal 167 is electrically connected with the circuit board 162. The terminal 167 is disposed on the operational surface SF of the second assembly member 140. Moreover, the second assembly member 140 further includes the terminal cover 169 (please refer to FIG. 13). The terminal cover 169 is configured to cover the terminal 167 when the terminal 167 is idled, such that water or dust is prevented from damaging the terminal 167.

Practically speaking, there are at least three functions of the terminal 167. Firstly, after the terminal cover 169 is removed, the terminal 167 can be electrically connected to an external processor (not shown) such that the external processor can amend or update the executive programs supported by the circuit board 162. The external processor in some embodiments is within a desktop computer, a laptop computer, a mobile device or other electronic devices but is external to the volume meter auxiliary module 100A. Secondly, the external processor can control whether the electrical connection of the battery 172 to the circuit board 162 is switched on or cut. For instance, the battery 172 supplies power to the circuit board 162 only after the external processor controls to switch on the circuit. In this way, there is a saving of electric power and the working life of the battery 172 can be increased. Thirdly, the terminal 167 can be electrically connected to an external processor which can perform other additional functions such as data transmission or data record. However, this does not intend to limit the present disclosure.

Furthermore, the second assembly member 140 further includes a real-time clock (RTC) 165. The real-time clock 165 is electrically connected to the circuit board 162. According to the actual situation, for example, the light emitter 164 and the image-capturing piece 166 are pre-set with the real-time clock 165 such that the light emitter 164 and the image-capturing piece 166 operate regularly in predetermined time intervals. For example, the light emitter 164 provides lighting and the image-capturing piece 166 captures images every day, every week or every month according to the real-time clock 165. However, this does not intend to limit the present disclosure.

As shown in FIG. 16, the volume meter auxiliary module 100C further includes a sealing element 190. The sealing element 190 is disposed between the platform 113 and the second assembly member 140. Therefore, water or dust is prevented from entering through the gap between the platform 113 and the second assembly member 140.

In conclusion, the volume meter auxiliary module of the present disclosure can be assembled on a fluid volume meter to capture the image of the display area of the volume value, so as to achieve the function of digitalization of the volume value of the fluid volume meter. During the period of image capture, since the brightness condition inside the casing body of the volume meter auxiliary module is controllable, the image capture can be carried out under the condition of stable lighting, which can prevent the situation of insufficient brightness or overexposure. Moreover, since the casing body of the volume meter auxiliary module has openings, the user can confirm the volume value by directly observing the display area of the volume value. Since the volume meter auxiliary module can be directly assembled on a fluid volume meter and no replacement of another fluid volume meter is required, the effect of the digitalization of the volume value of the mechanical fluid volume meter is achieved under the condition that replacement of elements is eliminated.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A volume meter auxiliary module, configured to be assembled on a fluid volume meter, the volume meter auxiliary module comprising:
    a first assembly member, comprising a clamping structure configured to fix the first assembly member on the fluid volume meter, the clamping structure comprising a platform, two holding components and at least two first locking components, the platform having at least one curved slot and a plurality of first through holes, the two holding components being configured to penetrate through two of the first through holes to define two second through holes with the platform, each of the second through holes being configured to be penetrated through by a portion of the fluid volume meter; and
    a second assembly member configured to connect with the first assembly member, the second assembly member comprising:
        a casing body having a first opening and a second opening, the first opening being located at a bottom of the casing body, the platform being configured to abut against the bottom of the casing body, the first locking components being located on a side of the platform abutting against the bottom of the casing body and configured to be respectively locked to at least one end of each of the holding components;
        a light emitter disposed inside the casing body;
        an image-capturing piece disposed inside the casing body;

a cover connecting with the casing body and covering the second opening, wherein the cover is rotatable relative to the casing body;

at least one locking portion connected with the casing body;

at least one locking piece configured to penetrate through the locking portion and the curved slot; and at least one second locking component located on a side of the platform away from the second assembly member and configured to be locked to the locking piece.

2. The volume meter auxiliary module of claim 1, wherein the second assembly member further comprises a water-proof gasket configured to be placed at the bottom of the casing body, the water-proof gasket surrounds the first opening.

3. The volume meter auxiliary module of claim 1, further comprising an elastic piece connected with the cover and the casing body.

4. The volume meter auxiliary module of claim 1, wherein the casing body of the second assembly member comprises an upper subsidiary casing body and a lower subsidiary casing body, the upper subsidiary casing body is detachably assembled at the lower subsidiary casing body, wherein the cover connects with the lower subsidiary casing body and extends from the lower subsidiary casing body to the upper subsidiary casing body.

5. The volume meter auxiliary module of claim 4, wherein the upper subsidiary casing body has an inclined surface, the second opening is located at the inclined surface, and the cover extending from the lower subsidiary casing body to the upper subsidiary casing body covers the inclined surface and the second opening.

6. The volume meter auxiliary module of claim 1, further comprising:

a light divider disposed inside the casing body, the light divider optically coupling between the cover and the fluid volume meter, and optically coupling between the image-capturing piece and the fluid volume meter.

7. The volume meter auxiliary module of claim 1, wherein the first assembly member further comprises a water-proof gasket located between the platform and the fluid volume meter.

8. The volume meter auxiliary module of claim 1, wherein the second assembly member has an operational surface substantially parallel with the platform, the second opening is located on the operational surface, and the cover is pivotally connected to the operational surface.

9. The volume meter auxiliary module of claim 1, further comprising:

a sealing element disposed between the platform and the second assembly member.

10. The volume meter auxiliary module of claim 1, wherein the second assembly member further comprises:

a circuit board disposed inside the casing body and electrically connected with the light emitter and the image-capturing piece; and a battery electrically connected with the circuit board.

11. The volume meter auxiliary module of claim 10, wherein the second assembly member has an operational surface substantially parallel with the platform and further comprises:

a terminal disposed on the operational surface and electrically connected with the circuit board, and the terminal is configured to electrically connect to an external processor.

12. The volume meter auxiliary module of claim 11, wherein the second assembly member further comprises:

a terminal cover configured to cover the terminal.

13. The volume meter auxiliary module of claim 10, wherein the second assembly member further comprises:

a real-time clock electrically connected to the circuit board.

* * * * *